Figure 4:
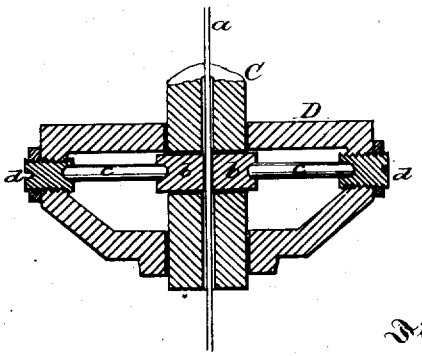

C. TYSON.

Machine for Screwing the Uppers on to the Soles of Boots and Shoes.

No. 6,483. Reissued June 8, 1875.

Witnesses:

J. A. Rutherford

John E. Laing

Inventor:

Charles Tyson by Johnson and Johnson his Attys

THE GRAPHIC CO. PHOTO-LITH. 39 & 41 PARK PLACE, N.Y.

C. TYSON.

Machine for Screwing the Uppers on to the Soles of Boots and Shoes.

No. 6,483. Reissued June 8, 1875.

Witnesses:

J. H. Rutherford
John E. Laing.

Inventor:

Charles Tyson
by Johnson and Johnson
his Attys

THE GRAPHIC CO. PHOTO-LITH. 39 & 41 PARK PLACE, N.Y.

4 Sheets--Sheet 3.

C. TYSON.

Machine for Screwing the Uppers on to the Soles of Boots and Shoes.

No. 6,483. Reissued June 8, 1875.

Witnesses:

J. H. Rutherford

John E. Laing.

Inventor:

Charles Tyson by Johnson & Johnson his Attys

THE GRAPHIC CO. PHOTO-LITH. 39 & 41 PARK PLACE, N.Y.

C. TYSON.

Machine for Screwing the Uppers on to the Soles of Boots and Shoes.

No. 6,483. Reissued June 8, 1875.

Witnesses:

J. H. Rutherford

John E. Laing

Inventor:

Charles Tyson by Johnson & Johnson his Attys.

THE GRAPHIC CO. PHOTO-LITH. 39 & 41 PARK PLACE, N.Y.

UNITED STATES PATENT OFFICE.

CHARLES TYSON, OF PHILADELPHIA, PENNSYLVANIA, ASSIGNOR, BY MESNE ASSIGNMENTS, TO CHARLES D. BIGELOW, OF BROOKLYN, N. Y.

IMPROVEMENT IN MACHINES FOR SCREWING THE UPPERS ONTO THE SOLES OF BOOTS AND SHOES.

Specification forming part of Letters Patent No. 149,007, dated March 24, 1874; reissue No. 6,483, dated June 8, 1875; application filed May 27, 1875.

*To all whom it may concern:*

Be it known that I, CHARLES TYSON, of the city and county of Philadelphia, in the State of Pennsylvania, have invented certain new and useful Improvements in Machines for Screwing the Uppers onto the Soles of Boots and Shoes, of which the following is a specification:

This invention relates to machines for uniting the soles to the upper, in the manufacture of boots and shoes, by means of screws cut upon a continuous wire, and in which, during the cutting of the screw-threads, the screw is at the same time entered into the material to firmly unite the sole and upper, and then severed from the wire, as in the machine patented to Amasa B. Howe, assignee of Eugene Lemercier, of date December 16, 1862. In such machine these several operations are effected by manual labor. By my invention these several operations are performed automatically in an organized machine, in which each successive step in the operation, except the rotary motion of the screwing-spindle, is performed by devices which are actuated by a cam-shaft, each revolution of which causes the complete operation required for the several things stated, while the motion of the cam-shaft and the screwing-spindle are continuous during the operation of forming, entering, and severing successive screws. The screws are automatically severed in proper lengths from a continuous wire, and after being inserted, to suit the varying and different thicknesses of stock by the co-operation, with the screwing-spindle, of a device or mechanism for griping or clamping the wire to the spindle to make the feed; a device or mechanism for arresting the descent of the griping device to release the wire from feed by the spindle; a work-pressing nose, and a work-supporting horn, the relative positions and operation of these several things harmonizing to feed and stop the feed of the wire to suit the thickness of the sole during the operation of inserting each screw and severing it from the wire. This is effected by reason of the distance between the work-pressing nose and the work-supporting horn being made equal to that between the depressor and the arresting device, and the clamp thereby held upon the wire for a length of time corresponding in its movement only to the thickness of the stock between the nose and the horn, and so determine the point of time at which the cutter shall be brought into action to sever the screw from the continuous wire. The feeding of the wire is effected by combining with the screwing-spindle a toggle-clamp, which slides upon and independent of the axial movement of said spindle. A detent or escapement device is combined and co-operates with the clamp-arresting device to maintain the latter in a fixed position while inserting the screw, and to arrest and release the clamp after such insertion, and is then tripped and moves out of the way to allow the spindle to have its full descent free of its hold upon the wire. As the spindle rises, the detent device is automatically brought into position to again hold the arrester in place to receive the descending clamp-stop and raise it upon the spindle as the latter descends to clamp the wire. A fixed and a tilting frame are combined with the several devices stated to effect their joint and specific operation, the detent or escapement device, the arrester, and the work-supporting horn being mounted upon the fixed frame, and the screwing-spindle, with its operating devices, the clamp-depressor, and the work-pressing nose are carried by the oscillating frame. In the operation of inserting and severing each screw the work must be released from the pressing-nose in order to free the work to allow it to be moved the required distance for each screw. This is effected by the automatic action of suitable devices or mechanism, combined with the oscillating pivoted frame, the cam-shaft, and the treadle-rod, whereby to effect the alternate pressing and releasing action of the nose upon the stock. In this action the oscillating pivoted frame has a yielding connection with the treadle-rod, whereby the nose is caused to press alike upon different thicknesses of stock.

The treadle-rod has a yielding connection with a pivoted band-shifter in such manner that the band is shifted upon the driving-pulley simultaneously with bringing the nose into working position by the depression of the treadle, and the work thereby pressed upon the horn at the moment of starting the machine. The work-supporting horn is capable of vertical adjustment in relation to the work-pressing nose, and it has combined therewith an extensible post for operation upon the heel portion of the sole.

Figure 5:
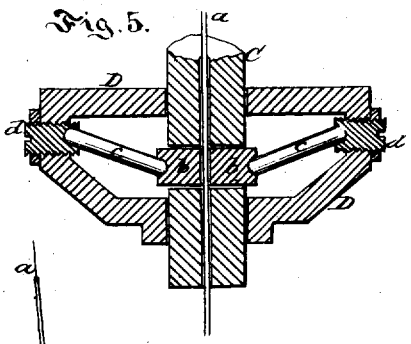
Figure 1:
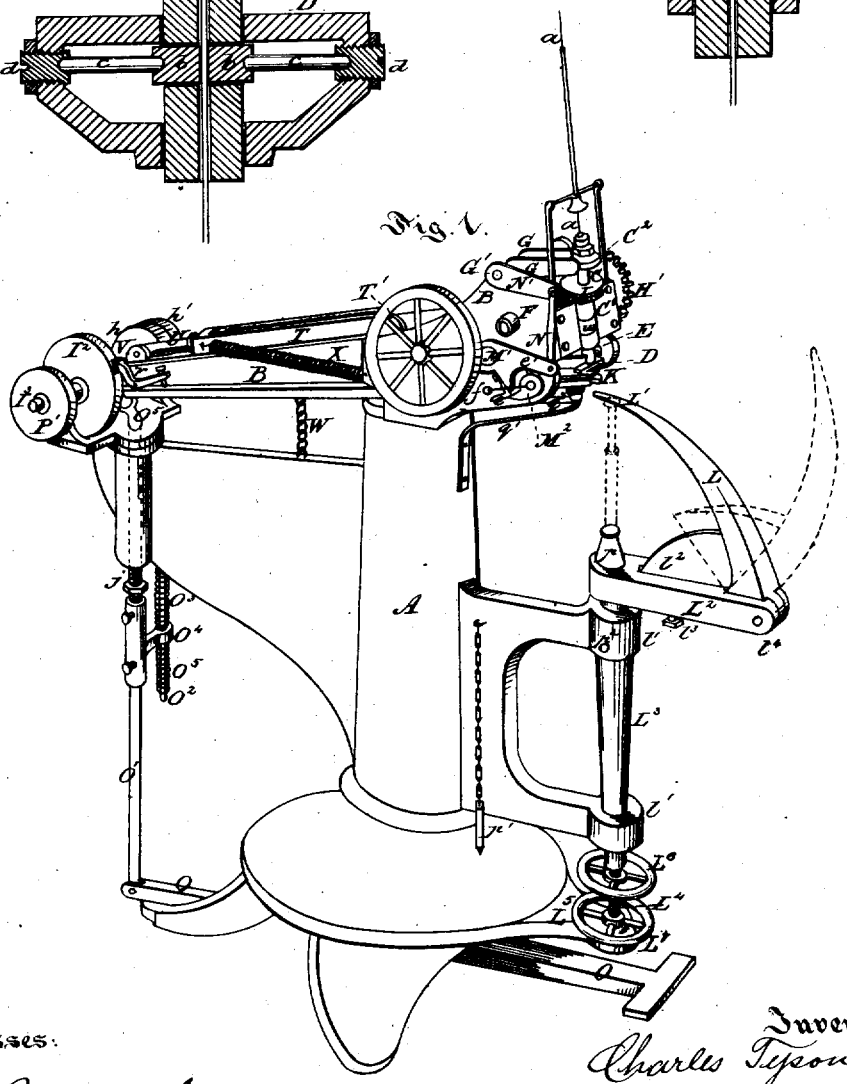
Figure 2:
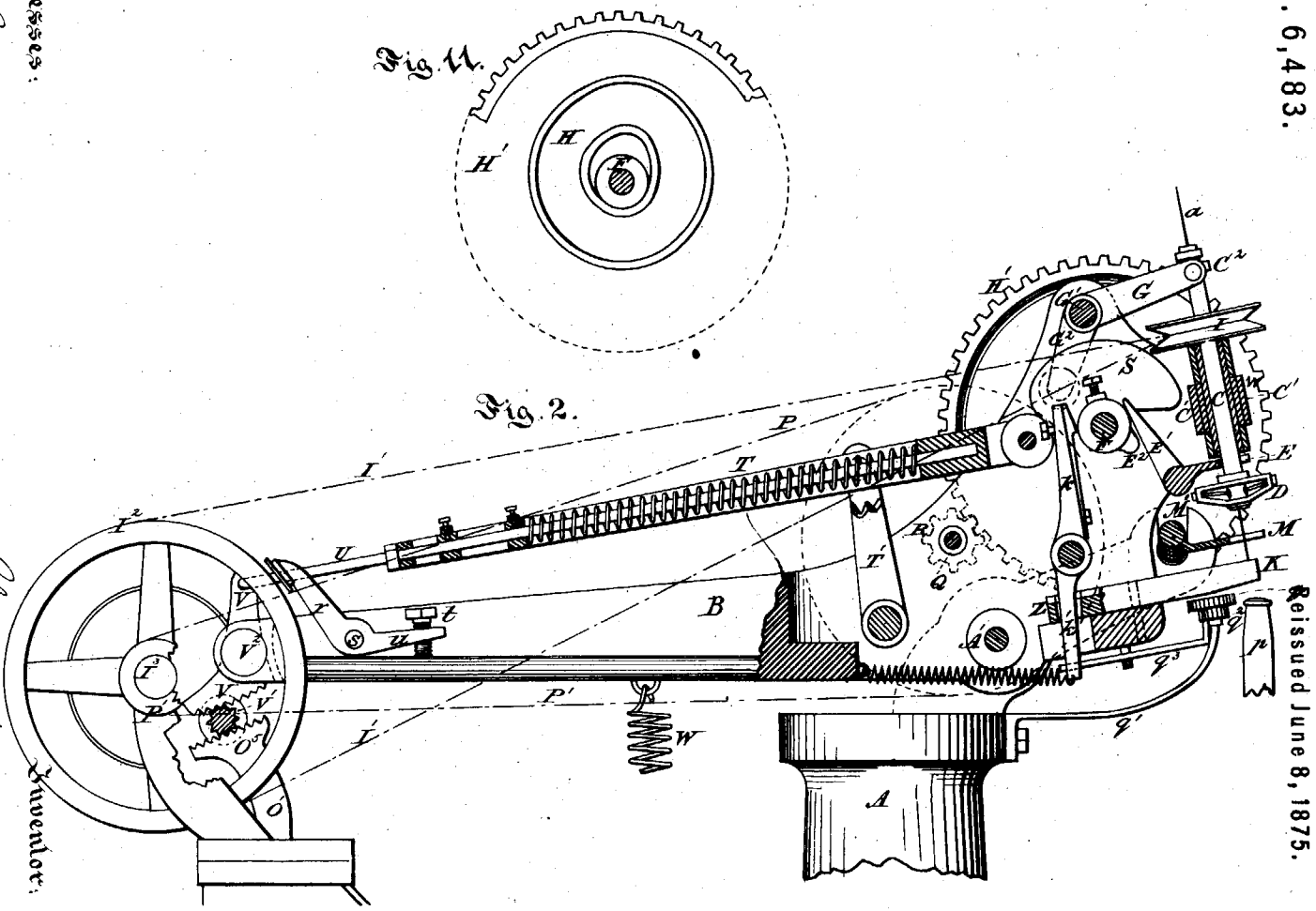
Figure 3:
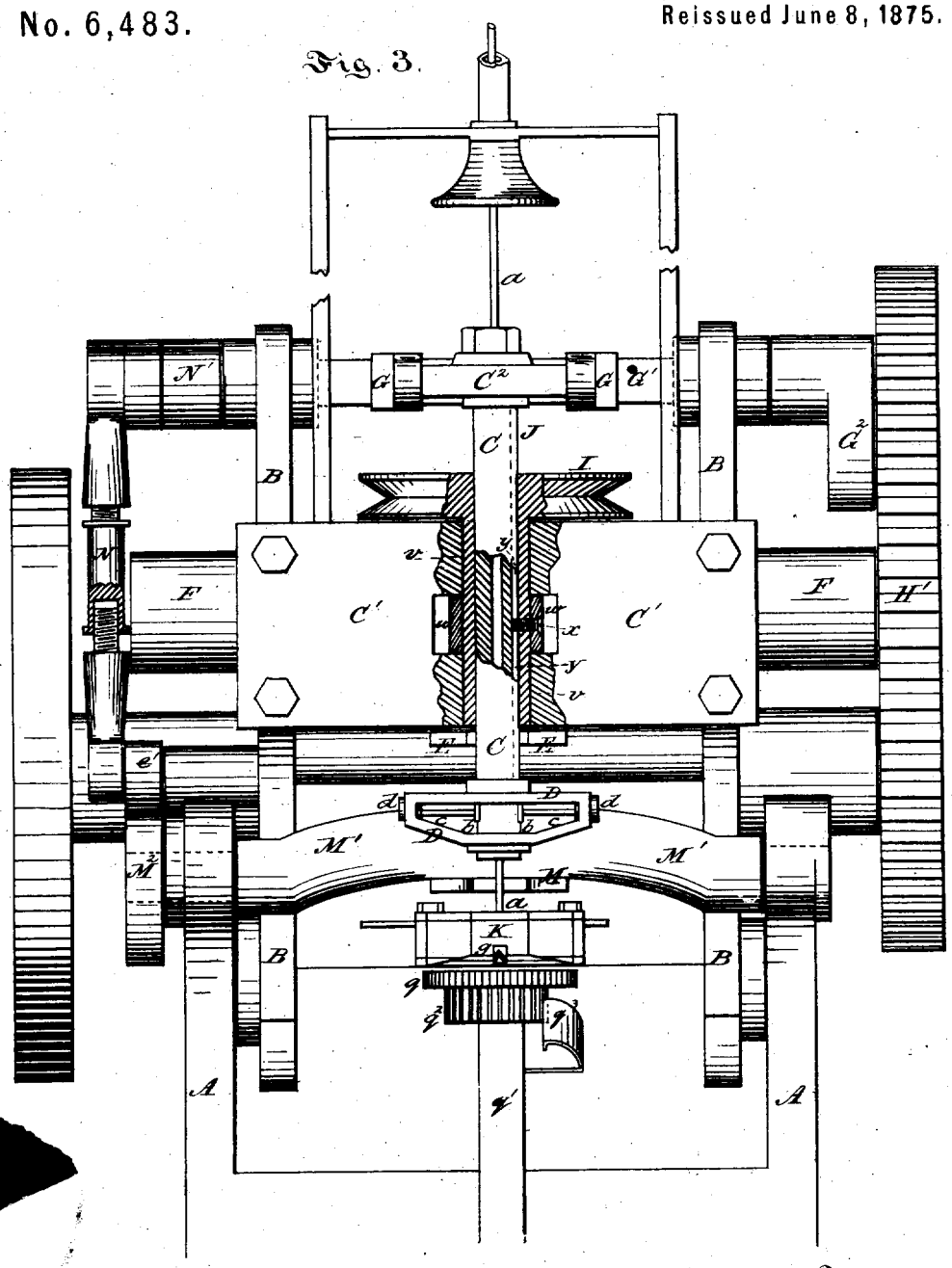
Figure 6:
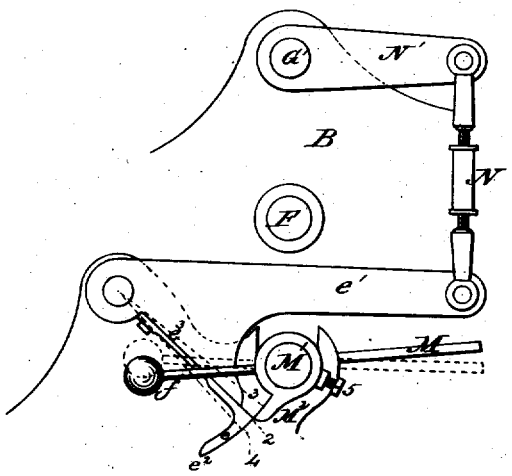
Figure 7:
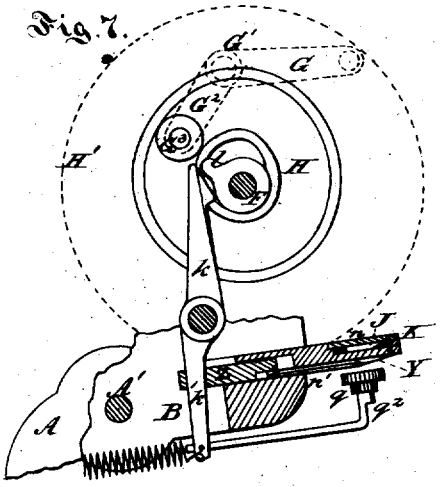
Figure 8:
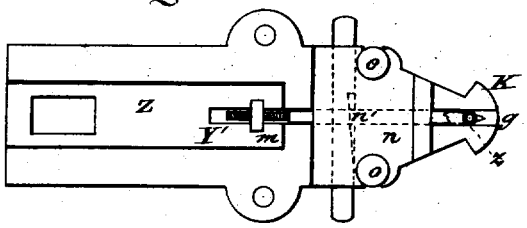
Figure 9:
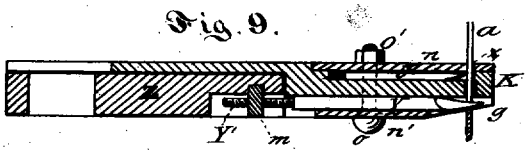
Figure 10:
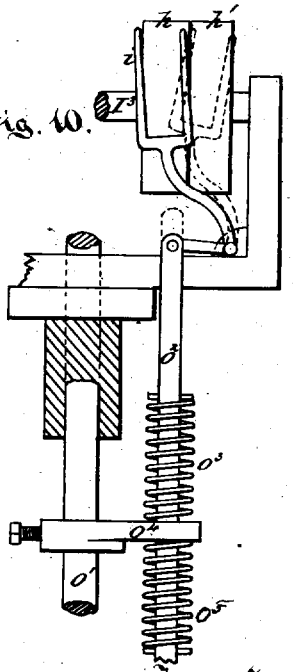

In the accompanying drawings, Figure 1, Sheet 1, represents a view in perspective of a screw-soling machine embracing my invention; Fig. 2, Sheet 2, a vertical section of the upper portion thereof; Fig. 3, Sheet 3, a front elevation; Figs. 4 and 5, Sheet 1, sectional views of the automatic feed-clamping device for the wire; Fig. 6, Sheet 4, a side view of the detent or escapement device for the arrester of the wire-feeding clamp; Fig. 7, same sheet, a section showing the manner of operating the cut-off for the screw; Figs. 8 and 9, same sheet, bottom and sectional views of the work-pressing nose; and Fig. 10, same sheet, the band-shifting device connecting with the treadle-rod.

Upon a fixed standard, A, a horizontal oscillating frame, B, is pivoted at A′, and arranged to carry several of the operating parts of the machine. The spindle C is carried by this frame and forms the guide for the wire *a*, and is mounted in a guide-head, $C^1$, at the front of said pivoted oscillating frame. This spindle has a rotary and axial movement to form the screw upon the wire and screw it into the material. The spindle carries at its lower end an automatic clamp, D, for laying hold of the wire, to cut the screw and screw it into the material, and the fixed frame A carries a device for automatically releasing the clamp after the screw has been driven home. In the combination and co-operation of the screwing-spindle with the clamp-slide D, the latter is free to be moved up and down upon the spindle; and the clamping devices consist of two steel jaws, *b b*, fitted within cross-openings in the spindle, and toggle-pins *c c*, which are socketed in the outer ends of the jaws, and of adjusting-screws *d d*, at the ends of the clamp. These jaws are operated so as to be closed upon and clamp the wire to the spindle. The forcing down of the clamp straightens the toggles and clamps the jaws against the wire to be fed down with the spindle, as shown in Fig. 4, and the upward movement of the clamp flexes the toggles *c c* to release the wire at the moment the screw has been driven home, as shown in Fig. 5, so that the spindle and its jaws finish their full descent free of the wire, and rise freely over it to take a new feed. This clamping device is moved by and between an upper and a lower automatic device, the functions of which will be presently stated. The clamping of the wire holds it firmly while cutting the screw and driving it into the sole, and the clamp-head revolves with the spindle by its toggle-connection therewith.

The clamping movement of the jaws *b b* is effected by a lever-depressor, E, Figs. 2 and 3, fixed to and projecting from a rock-shaft mounted in the pivoted frame B, so that its front forked end will straddle the spindle above the clamp, while its rear $E^1$ extends back to receive the action of a cam, $E^2$, on a cam-shaft, F, carried by the pivoted frame, and each revolution of the cam $E^2$ will depress the lever E upon and force down the clamp D to bite the wire, to cause the spindle to form and drive each screw. The spindle is suspended by a swiveling connection, $C^2$, from horizontal arms G G mounted on a rock-shaft, $G^1$, which is operated by an arm, $G^2$, which receives a vibratory motion from a groove-cam, H, Figs. 7 and 12, upon the face of a cog-wheel, $H^1$, on the cam-shaft F, and thereby gives to the spindle its rising and driving movement, the cam H being of such form as to make the descent of the spindle gradual, and commencing just after the wire is clamped, and the ascent of the spindle to take place just after the screw is cut from the wire. The rotary motion of the spindle to cut and screw in the screw is produced by a sleeved pulley, I, driven continuously by a band, $I^1$, leading to a pulley, $I^2$, on the driving-power shaft $I^3$ at the rear of the frame. The pulley-sleeve, *v* is secured in the guide-head by a collar, *w*, and a screw, *x*, passing through the collar and the sleeve, enters a groove, *y*, in the spindle, to allow the latter's axial movement to drive the screw while being revolved to cut the thread. The nose K projects forward from the under side of the pivoted frame B, and during the above-stated operations of the spindle the nose is brought down upon and firmly holds the work upon a beak-iron or horn, L, sustained in proper position for the purpose, by means to be hereinafter described. This work-pressing nose carries both the screw-chaser and the cut-off for the wire.

The unclamping movement of the clamp-head D is effected by a forked gage or arrester, M, Figs. 2 and 3, mounted upon a rock-shaft, $M^1$, in the fixed frame, and held by an escapement detent in a fixed position between the clamp-head and the nose K, to arrest the descent of the clamp-head, and release the jaws *b b* from the wire, while the spindle continues its descent to the full length of its movement, which must be sufficient for the longest screw required. Immediately after releasing the clamp the arrester is tripped, and is moved down out of the way by the still descending spindle. The device for holding and tripping the arrester M consists of a stop-projection, $M^2$, on the left end of the rock-shaft $M^1$, and which is held in its fixed position by a spring-detent, *e*, carried by an arm, $e^1$, pivoted upon the fixed frame, and connected by an adjustable link, N, to an arm, N′, upon the rock-shaft $G^1$, which elevates and depresses the spindle through the cam H. The arm N′ must be of the same length, and in the same radial position, or nearly so, as the arms G, which carry the spindle, to insure an equal movement of the detent-arm $e^1$ with that of the spindle-carrying arms. The detent $e$ is a spring-plate, having its acting end in the form of a segment, $e^2$, of a circle, whose center is the axis of the detent-arm $e^1$, and the stop-projection $M^2$ has a flat side for action against the segment $e^2$, so that the spindle with its clamped screw has descended a distance equal to that between the nose K and the beak-iron L. The stop-projection $M^2$ having held the rock-shaft $M^1$, and consequently the arrester, stationary, until the wire is released, will at this moment pass the angle 2 of the segment-detent $e$, and thereby allow the arrester to be free to move down out of the way of the spindle-clamp, as shown in Fig. 6.

After the spindle has its full descent it is raised, and with it the clamp, by the cam H. The arrester follows the clamp-head up to bring it into position to be again caught by the detent, (and the clamp-head is at the same time brought into position to again clamp the wire,) by an adjustable weighted arm, $f$, Figs. 1 and 6, secured to the rock-shaft $M^1$ and extending backward, constantly exerts its force to bring up the arrester, which thereby carries the escapement-projection $M^2$ past the angle 2 of the detent $e$, which, being a spring-plate, yields for that purpose and allows the projection $M^2$ to again rest against the segment $e^2$ to hold the arrester in its fixed position.

In Fig. 6, the parts occupy the position, just before the escapement takes place, at the point 2, while the dotted line 3 shows the position of the detent $e$ while holding the arrester M, to act upon and release the clamping device, and the dotted line 4 indicates the point to which the detent is carried after the escapement, and while the screwing-spindle is making its full descent. For determining the accuracy of the required adjustment of these parts the stop $M^2$ and the connecting-rod N are made adjustable. The detent-arm $e^1$ has a movement due to that of the tilting-frame B, and also a movement due to the action of the arm N′ upon the rock-shaft $G^1$, the result of which is that, in proportion as the nose K approaches the beak-iron L, governed always by the thickness of the material, the spring-detent will approach the point at which the escapement must take place. Consequently, if the material be thin, the points of escapement will have been more nearly reached, or closer together, than when a greater thickness of material is under operation. For example, if the nose approaches the beak-iron an eighth of an inch, then the spring-detent arm $e^1$ will be in that position that an eighth-of-an-inch movement will bring the detent at the point of escapement. In this movement the arm $N^1$ and spindle also descend the same distance, and the spring-detent $e$ will be at the point 2, to allow the projection $M^2$ to pass it and free the arrester M, to be depressed out of the way by the continued descent of the clamp.

The length of the screw is regulated to suit the varying thickness of the work and of the sole, such as the shank of the sole, which requires a shorter screw, by the following devices in their joint operation: The clamp-depressor E and the pressing-nose are brought down by the tilting-frame, to put the nose in working position with respect to the fixed arrester and the horn. Now, as the clamp D is driven down by the depressor E, (which has a movement independent of the tilting-frame,) the wire will be clamped in the spindle and carried down until the clamp-head comes in contact with the arrester, which releases the wire, which will have been fed a length equal to the distance the spindle has traveled while the wire was clamped. By this action the distance between the depressor and the arrester is varied as the distance between the nose and the horn is varied—one governing the other—and being determined by the thickness of the material. It follows that the clamp will hold the wire from the time the depressor has clamped it until the clamp, descending with the spindle, strikes upon the arrester, which instantly makes the release, and the distance of the movement of the clamp and spindle while the wire is clamped will be equal to the distance between the nose and horn, which distance is always determined by the thickness of the sole, and thereby regulates the length of the screws. By adjusting the height of the beak-iron with respect to the nose, the screws may be screwed partially through the material and not clinched. This adjustment is effected by supporting the stem $L^3$ of the beak-iron upon an adjusting-screw, $L^4$, screwed into a projection, $L^5$, of the main frame, and provided with a hand-wheel, $L^6$, and a lock-nut, $L^7$, which locks the screw-stem to the fixed frame.

The nose K is brought into position over and near the material upon the beak-iron L by a treadle, O, pivoted at the base of the frame, and acting, through a rod, $O^1$, to depress the front end of the pivoted frame, which carries said nose. This action of the treadle O at the same time shifts the driving-belt from a loose pulley, $h$, to a fixed pulley, $h'$, upon the power driving-shaft $I^3$, and thereby revolves the spindle and puts in motion the operating mechanism of the pivoted frame. The band-shifter $i$ is pivoted upon the fixed frame and connected to the treadle-rod $O^1$ by a side rod, $O^2$, and an arm, $O^4$, through which the rod $O^2$ is free to slide, and over which the arm $O^4$ has a certain movement against an upper spring, $O^3$, and a lower spring, $O^5$, on the rod $O^2$, which has a crank-connection with the band-shifter, and limits the vibration of the latter. The upper spring $O^3$ forms a yielding lift to shift the band to the fixed pulley $h'$ and allow the treadle-rod $O^1$ to rise a little farther in bringing down the nose. The lower spring $O^5$ cushions the descent of the treadle-rod and allows it to fall a little lower than the movement of the shifter-rod in shifting the band to the loose pulley $h$. This arrangement of the rod-shifter springs cushions both the upward and downward thrust of the treadle-rod. A belt, P, from the pulley P′ on the driving-shaft $I^3$ gives motion to a shaft, Q, a pinion, R, Fig. 2, on which matches with the cog-wheel $H^1$ on the cam-shaft, and thus automatically operates the several parts. A sliding frame, T, is mounted upon a pivoted arm, T′, and carries a rod, U, which connects with a cam or bell-crank lever, V, pivoted to the rear end of the tilting frame in position to bear upon the head of the treadle-rod $O^1$. A cam, S, on the cam-shaft F, on starting the machine, acts upon the front end of the sliding frame T, and, moving it backward slightly, vibrates the bell-crank lever V, to which the rod U is connected. As the end of the lever V rests upon the upper end of the treadle-rod $O^1$, and as the latter is held up by the foot against a stop, *j*, Fig. 1, which limits the ascent of the treadle-rod $O^1$ and the point to which the nose K can be brought down by the foot, it follows that the rearward movement of the frame T must, by the action of the lever V, raise the rear end of the tilting frame B, and thereby bring the nose K down firmly upon the material. Under this action any variation in the thickness of the material will be compensated for by the yielding of the connecting-rod U, which has a spring attachment with the reciprocating frame T for that purpose, as shown in Fig. 2. The tilting frame B is constantly pulled down at its rear end by a spring, W, attached to the fixed frame, and the reciprocating frame T is constantly pulled forward against its operating-cam S by a spring, X, attached to the pivoted frame, as shown in Fig. 1. The nose has a movement within fixed limits, governed by the stop *j*, and in order that it may press upon the material, thick or thin, it is connected with the treadle by the spring-connection of the rod U, so that the spring upon said rod U will yield when the nose presses upon the material, and thus compensate for an irregularity in the thickness of the material and press all alike. The stop *j* acts in connection with the spring-rod U to obtain this result.

The screw-chaser J is made adjustable, and is arranged on the upper side of the nose, which has a vertical opening through it for the passage of the wire in contact with the screw-chaser. The cutter Y, for cutting off the screw, is arranged in the under side of the nose in a slide, Z, which moves in a groove in the nose-piece, and by which the cutter is connected to a lever, *k*, pivoted in the tilting frame, and operated by a cam, *l*, Fig. 7, Sheet 4. The stem Y′ of the cutter has a screw-thread, and is screwed into a nut, *m*, Figs. 8 and 9, fixed in the slide Z, whereby the cutter may be adjusted, and removed and replaced when necessary. The chaser J and the cutter Y are both held within their respective grooves in the nose by removable plates *n* and *n′* for access to these parts. These plates *n n′* are secured to the nose by screw-bolts *o*, fitting into notches in the edges of the plates and nose, and clamped by screw-nuts *o′*, so that by slackening off the nuts the bolts and plates can be easily removed when anything is is required to be done to either of the cutters, and the several parts replaced.

The beak-iron L is arranged so that its acting-point $L^1$ will be directly below the nose K. It is pivoted at its lower end to a horizontal arm, $L^2$, so as to be turned back out of the way. This arm $L^2$ is fixed upon a vertical stem, $L^3$, mounted in guide-bearings $l^1$ $l^1$ in arms of the fixed frame, and upon which stem $L^3$ the beak-iron and its arm $L^2$ is free to be swung round horizontally as the work progresses. The beak-iron has a branch arm, $l^2$, by which it is supported, and may be adjusted upon its pivot by a screw, $l^3$, in the arm $L^2$, so as to raise and lower acting-point $L^1$, with respect to the nose. This pivoted horn is for use in screwing on the soles, and being of metal clinches the inner ends of the screws when the latter strikes it as they are screwed home. The horn is turned back out of the way upon its pivot $l^4$ when the sole-work is finished, and the heel portions of the soles are supported for operation by a post, *p*, which fits snugly within a deep socket in the vertical stem $L^3$, and which is elevated and supported within said socket at the proper height by a pin, *p′*, passing through the stem beneath the post; or any suitable device may be used for this purpose when the post is substituted for the horn.

A feed arrangement for the work may be used and operated by the cut-off lever *k k′*, as shown in Figs. 2 and 7, if desired, so that the feed of the work shall take place by the back stroke of the lever *k′*, just after the screw has been severed and the nose is raised. The lever *k* is kept in position to operate the cutter by the action of the cam *l* by a spring in any suitable way, which constantly draws the lever forward and the knife back.

When the work upon the soles from shank to shank is finished, the machine is stopped by the operator removing his foot from the treadle O, which instantly shifts the driving-band by the shifter *i* from the fixed to the loose pulley. The momentum of the shaft $I^3$ and its pulley tends to continue the motion of the working parts a little, and to avoid this I employ a brake, *r*, pivoted at *s* to the tilting-frame in a position to bear upon the pulley $I^2$, and to stop the machine, as shown in Fig. 2. The brake is adjustable by a screw, *t*, passing through a branch arm, *u*, and its capacity to stop the machine is derived from the movement of the frame B, which, upon the full descent of the rear end of said frame, brings the brake *r* down upon the pulley $I^2$, and instantly stops it. The depression of the nose K is limited by the stop *j* on the treadle-rod, and instantly raises the brake, and releases the driving-dulley $I^2$, and in this way the oscillating movement of the nose-carrying frame is utilized to put on and take off the brake.

The depressing movement of the tilting frame must have a certain exactness with the action of the escapement devices, and for obtaining such exact adjustment the rod N which connects the two things is provided with a proper screw-connection, as shown in Fig. 6.

The screw is cut with a divided or notched end to clinch it when entered against the horn. In operating the machine the treadle O brings the nose down near the sole, but not upon it, the stop *j* preventing contact, and this movement simultaneously shifts the band from the loose to the fixed pulley *h'*, and the screwing-spindle C and cam-shaft F are set revolving by the bands $I^1$ and P, Fig. 2. The cam S, acting upon the cam-lever V of the reciprocating frame T, lifts the rear end of said frame, and depresses its front end hard upon the sole, in which position it is held by the concentric portion of the cam S. As soon as the nose is pressed upon the work, as stated, the spindle commences its downward movement by the cam H, and the cam $E^2$ acts upon the arm $E^1$ of the depressor E, and forcing it down by a more rapid movement than the spindle clamps the toggle-jaws *b b* upon the wire, and the spindle, with its clamp, is then continued down by the cam H, through the the action of the connecting-arms G $G^2$, which forces the wire through the opening *z* in the nose, and has the screw-thread cut. The spindle continuing its descent and revolving screws the screw into and through the material and against the horn. At this point the clamp-head D has pressed upon the arrester M sufficiently to release the jaws *b b* and unclamp the wire. The arrester is at this moment set free by the spring-detent *e* being caused to pass the stop $M^2$ by the joint action of the arms $e^1$ N N' connecting with the spindle-driving rock-shaft $G^1$. The arrester being free descends with the clamp D, and the spindle continues the remainder of its descent idly, this lost motion being required for the greatest possible length of screws. At the proper point the cutter is now driven forward by the cam *l* and lever *k*, and cuts off the entered screw. The cam S having now passed its concentric surface allows the rear end of the tilting frame B to drop, and thereby raise the nose. In this way both sides of the sole are screwed from shank to shank, the beak-iron being swung round to turn the toe.

The machine is stopped by removing the foot from the treadle, and bringing the brake *r* into action. In working upon the heel portion of the sole the beak-iron is turned back, as shown in dotted lines in Fig. 1, and the stem-post *p* raised and supported in its socket at the proper height, and the heel portion is now secured in the same way as the soles. The curved end of the horn is not so well adapted for work on the heel portion of the sole as the vertical stem. The wire is suitably supported above the spindle and fed down through it by the rising and depressing action of the clamp.

Having described my invention, I claim—

1. In a machine for screwing the uppers onto the soles of boots and shoes, a clamp, D, for the wire, having a rising and falling movement upon the screwing-spindle, in combination with the spindle C, having an axial and revolving motion, essentially as and for the purpose stated.

2. The combination of the sliding clamp-head D with the toggle-clamp for the wire, and the screwing-spindle, operating substantially as described.

3. The combination of the clamping device for the wire with a depressing device, E, or its equivalent, for operating the clamping device, essentially as described.

4. The combination of the clamping device for the wire and its operating device E, with an arresting device, M, for releasing the wire from the clamp, essentially as described.

5. The arresting device M, for releasing the wire from the clamp, in combination with a holding-and-tripping or escapement device, *e* $M^2$, for holding the arrester and allowing it to drop out of the way of the clamp, for the purpose stated.

6. In combination, the depressor E, clamp D for the wire, arrester M, and nose K, and the beak-iron L, operating substantially as and for the purpose described.

7. The combination, in a sole-screwing machine, of the depressor E, the clamp for the wire, the arrester M, the presser-nose K, and the fixed horn, with their operating mechanism, whereby the distance between the nose and the horn will be made equal to that between the depressor and the arrester, to determine the length of each screw by the thickness of the material which may be at the time between the horn and the nose.

8. The escapement-detent *e*, and the stop $M^2$, arranged upon the fixed frame, in combination with the screwing-spindle and the operating-cam H, arranged upon the tilting frame B, connected, substantially as described, and for joint operation to release the arrester M at the moment the wire is unclamped, to free the arrester for the farther descent of the spindle, essentially as described.

9. The arrester M, in combination with the escapement devices and the weighted arm *f*, whereby the arrester is raised in position to be held by the detent during the ascent of the spindle, for the purpose, and essentially as described.

10. The combination, with the cam H, of the adjustable connecting-rod N, and the escapement-detent device *e* $M^2$, operating substantially as described, and for the purpose set forth.

11. In combination, the screwing-spindle, its clamping device D, for the wire, and the clamp-depressor E, the presser-nose K, and the cut-off for the screw, carried by the tilting frame B, and the arrester M and its escapement devices *e* $M^2$, carried by the fixed frame, and having their several and distinct movements produced from the cam-shaft F (except the rotary motion of the spindle) automatically, and in their respective successive relations to each other, for the purpose, and essentially as described.

12. The combination, in a sole-screwing machine, of the oscillating pivoted frame B, with mechanism by which the presser-nose K is alternately depressed and elevated automatically at the insertion of each screw during the operation of the machine, substantially as herein set forth.

13. The combination of the reciprocating frame T with the oscillating pivoted frame B, and the treadle-rod $O^1$, to effect the automatic alternate pressing and releasing action of the nose K upon the stock, essentially as described.

14. The combination, with the oscillating pivoted frame and its pressing-nose of the adjustable stop *j*, treadle-rod $O^1$, and treadle, whereby the descent of the nose is regulated within fixed limits, to afford working freedom with the horn, as set forth.

15. The combination, with the oscillating frame B, the treadle-rod $O^1$, and the treadle O, of the connected side rod $O^2$, provided with the springs $O^3$ and $O^5$, and the pivoted band-shifter *i*, whereby the band-shifter has a cushioned connection with the treadle and the shifting of the band made by the act of bringing the nose into working position, as herein set forth.

16. The combination, with the treadle and its rod $O^1$, of the yielding connecting-rod U, of the reciprocating frame T, and the oscillating pivoted frame B, whereby the nose is made to press upon different thickness of work, as set forth.

17. The combination, with the adjustable treadle-stop *j* and the pressing-nose K, of the vertically adjustable horn-stem $L^3$, whereby both the horn and the nose have fixed adjustments in relation to each other, as set forth.

18. The cutter Y, for severing the screw, having a screw-stem, Y′, and nut *m* for adjustment, as described.

19. The removable plates *n n′* of the nose K, arranged and secured as described, and for the purpose stated.

20. The combination of the spindle C for rotating the wire with the lever G connected with said spindle, and an escapement-detent, substantially as described, with the clamping device D, and a screw-cutter, Y, whereby the thread is cut upon the wire without a screw-spindle.

21. The beak-iron L, pivoted as described, in combination with the stem-adjusting screw $L^4$ and its lock-nut $L^7$, as and for the purpose described.

22. The socketed stem $L^3$ of the beak-iron, in combination with the extensible post *p*, essentially as described, and for the purpose stated.

23. The combination of the socketed extensible post *p* with the removable supporting-pin *p′* for said post, as described.

24. The combination, with the driving-pulley $I^2$ and the oscillating frame B, of the brake *r*, arranged to be operated by the said oscillating frame in the manner and for the purpose described.

In testimony whereof I have hereunto set my hand in the presence of two subscribing witnesses this 26th day of January, A. D. 1875.

CHARLES TYSON.

Witnesses:
JNO. A. BELL,
THOS. H. BETTS.